(No Model.)
E. MAERTENS.
PROCESS OF AND APPARATUS FOR EXTRACTING WITH VOLATILE SOLVENTS.
No. 545,900. Patented Sept. 10, 1895.
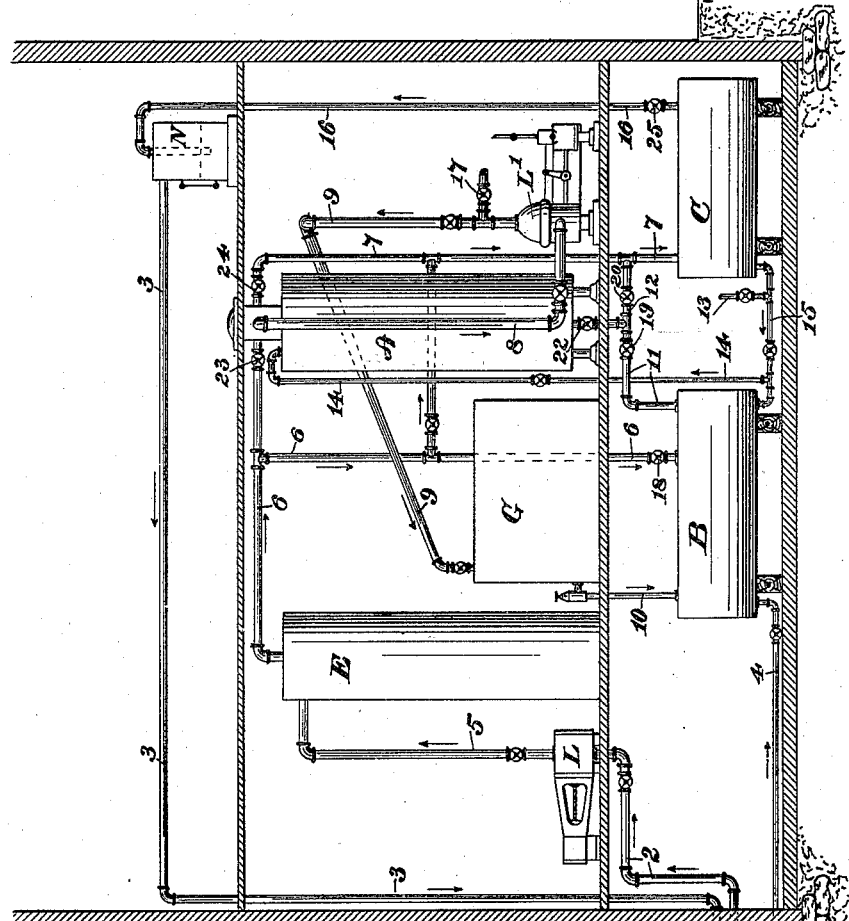
Witnesses.
Fred Arnold.
William M. King.
Inventor.
Emile Maertens.
by Remington & Hinkson
Attys.

UNITED STATES PATENT OFFICE.

EMILE MAERTENS, OF PROVIDENCE, RHODE ISLAND.

PROCESS OF AND APPARATUS FOR EXTRACTING WITH VOLATILE SOLVENTS.

SPECIFICATION forming part of Letters Patent No. 545,900, dated September 10, 1895.

Application filed April 16, 1895. Serial No. 545,891. (No model.)

*To all whom it may concern:*

Be it known that I, EMILE MAERTENS, a citizen of the United States, residing at Providence, in the county of Providence and State of Rhode Island, have invented certain new and useful Improvements in Processes of and Apparatus for Extracting with Volatile Solvents; and I do hereby declare the following to be a full, clear, and exact description of the invention, such as will enable others skilled in the art to which it appertains to make and use the same, reference being had to the accompanying drawing, and to letters and figures of reference marked thereon, which forms a part of this specification.

The invention forming the subject of my present application for patent relates to improvements in apparatus and process for extracting from materials by means of suitable volatile solvents resinous, oily, essential, fatty, and other analogous matters, said invention being an improvement on apparatus and processes described in a pending application for patent filed by me in the United States Patent Office, Serial No. 517,573. I would state that most of the volatile solvents usually employed—such, for example, as naphtha, bisulphide of carbon, &c.—form, when combined with air in the proper proportions, dangerous explosive mixtures; also, when air or some kinds of gases are brought in contact with such volatile solvents they absorb a certain amount of vapors of the latter which cannot be recovered by a simple cooling operation, such as passing such a mixture through a condenser. The object which I have in view in this later invention is to overcome some of the disadvantages just referred to and to insure greater safety in the treatment of materials with volatile solvents by guarding against explosions or fires and resulting in greater economy in the use of solvents while carrying out such extracting operations. In my said pending application for patent I have described a process in which compressed air or gas is employed for moving the solvents. While this movement is taking place, the compressed air or gas gets mixed with the vapors of the solvents. Now, if such vapor-laden air or gas is exhausted or blown out into the atmosphere the solvent carried by it is lost or wasted. If, on the other hand, it is confined in a tank, it may form an explosive mixture, which is liable to become ignited by lightning or other accidental cause.

My invention consists, essentially, in the employment of any suitable gas or mixture of gases as a moving medium or a confined atmosphere, and which gases or mixture of gases are, by preference, of the inert class, such as nitrogen, carbonic acid, &c., and adapted to form a non-explosive mixture when mixed with air or with vapors of the solvent used in operating or treating the materials.

It further consists of a novel apparatus, by means of which air, gas, or a mixture of gases, when mixed with solvent vapors, can be stored and repeatedly reused without appreciable loss of solvent or gas.

In order to clearly illustrate my invention, I have prepared the accompanying drawing, which represents a side elevation, in partial section, of an apparatus embodying my improvement.

In the said drawing, A indicates a closed digester arranged to receive and contain the animal fiber or material while it is being subjected to the treating operation for the purpose of extracting therefrom the said resinous, fatty, and other analogous matters.

B C are suitably-connected storage tanks or reservoirs containing the solvents used in the digester.

E is a reservoir for compressed gas, communicating with a gas-compressor L by means of pipe 5 and with the digester by pipe 6. Compressed gas is also supplied to the digester and storage-tanks by means of the valved pipe 6.

G is a surface condenser arranged to discharge into tank B through the valved pipe 10. It is also in communication with a vacuum-pump L' by means of the valved pipe 9, through which latter said pump discharges into the condenser. The pump is also in communication with digester A by means of the valved connection 8.

K and K' indicate a gas-generator, the gas generated by it being stored in the well-known bell-shaped inverted holder $K^3$, capable of vertical movement in the tank $K^2$, the latter containing water and forming a gas seal, as common. The gas as it is produced passes into the holder $K^3$ via pipe 1. The gas is conducted from the holder to the inlet of the gas-compressor L by a pipe 2. The pipe 3 is used to return gas to the holder from an elevated trap-tank N, and the pipe 4 is employed for conducting the solvent condensed in the holder K³ to the initial storage-tank B containing condensed solvent. The said tank N forms a seal or trap from the fact that the gas passing upwardly from the solvent-tank C, via the valved connection 16, is discharged below the surface of the water contained in the tank. (See dotted lines.) The gas finally returns from the tank N into the holder K³ through pipe 3, as before stated. I would add that pipe 11 is employed for conducting gas from top of tank B into top of tank C, suitable stop-valves being closed meanwhile. The short pipe 12 serves to lead the solvent from digester A into the storage-tank C, said pipe being connected with the lower portion of gas-pipe 7 for the purpose.

13 indicates a valved pipe arranged to conduct solvent from tank C into a still. (The latter not shown.)

14 is the vertical pipe through which solvent is forced from the tanks into the digester. The bottoms of both solvent-tanks are connected by a valved pipe 15, whereby solvent may be transferred from one tank to the other, the said pipe 14 being in communication with pipe 15.

The operation of the parts forming the apparatus before described is as follows: The gas-holder K³ is assumed to be filled with gas produced, say, in the contiguous generator. I prefer to manufacture and use nitrogen or carbonic-acid gas from the fact that gases of this character do not make an explosive compound when mixed with atmospheric air or with solvent vapors in any proportion. The gas is drawn through pipe 2 into the compressor L, and from the latter it is delivered, under considerable pressure or in a compressed form, through pipe 5 into the reservoir or tank E, from which latter the air has been previously exhausted by the vacuum-pump L', the air at the same time also having been exhausted by the same means from all the piping, tanks, digester, condenser, &c., forming part of the system into the atmosphere through valve 17. It is further assumed that the digester A has been charged with the material to be treated prior to the exhaustion of the air and also that the tank B contains the extracting-solvent. Now, solvent is forced or moved from the tank B into the top of the digester through pipe 14 by the introduction through pipe 6 of compressed gas from reservoir E into said tank. When the digester is thus filled with solvent, the flow of compressed gas is cut off from the tank B by closing valve 18, and the gas which has accumulated inside of the tank is allowed to return to the holder K³, charged with whatever solvent vapors it has absorbed by contact. Such return of the gas to the holder is effected through pipes 11 and 12, valves 19 and 20, tank C and its valve 25, pipe 16, trap-tank N, and pipe 3, connecting the trap-tank and holder. The said solvent admitted into the digester A having now done its work by acting upon the material with which the digester is charged, it (the solvent) is next discharged into tank C, first opening valve 22, closing valve 19, and admitting compressed gas to the top of the digester by opening valve 23. The gas contained in tank C escapes to the holder through the channels described, after which the contents of the digester are again impregnated with solvent, substantially as previously described, the gas contained in the digester being at the same time forced therefrom into the holder K³ via valve 24, pipe 7, and tank C, &c. The charged solvent in tank C is conducted to any common or suitable still through the valved pipe 13 and returns to tank B from the still via the condenser G, the still and its connecting piping being omitted from the drawing. When the digester has been finally drained of solvent, substantially as previously described, the residual solvent adhering to the fibers or materials under treatment is volatilized and its vapors, as well as the gas contained in the digester, are drawn out of the latter by the pump L' through pipe 8 and tank B, &c. The condensed solvent remains in tank B, but the gas charged with solvent vapors and which was drawn from the digester returns to the holder K³ by the way of tank C, as previously described. Any solvent vapors condensed in the holder K³ are returned to tank B by the pipe 4, the inlet of which is slightly above the water-level in the tank K².

I am aware that in certain processes air impregnated with solvent vapors has been pumped into tanks and compressed, in order to recover or liquefy the solvent; but I am not aware of the existence of any other apparatus or system, except the one described in this specification, wherein either air, gas, or a mixture of gases is taken from a holder, circulated and returned to said holder, impregnated or saturated with solvent vapors, circulated and used over and over again, and the loss of solvent thus avoided; nor am I aware that in any other existing systems have volatile solvents been moved by a compressed gas, or that the material upon which such solvents are used has been treated in an atmosphere of such a gas the nature of which is to form a non-explosive compound when mixed with the solvent vapors or which also does not form an explosive compound when mixed with atmospheric air.

It is evident that atmospheric air can be used for replacing or moving solvents, and that when used as a confined atmosphere in which to carry on extracting operations, and in conjunction with devices as described and shown in this specification and drawing, the saving of solvent will be effected; but, although I do not wish to confine myself thereto, I prefer to use an inert gas for the purpose, because by so doing I avoid the danger which exists when air and solvent vapors become mixed in such proportions as to form an explosive mixture. While, as just stated, confined atmospheric air can be used for moving the solvents, it is to be noted that in order to so use it with safety the air must be heavily laden or surcharged with the solvent vapors, in which state the mixture is practically non-explosive; but while the air is being thus surcharged there is great risk run from the fact that when the thus confined air and solvent vapors become mixed in suitable proportions they do form an explosive mixture, which is liable to become ignited by lightning or other accidental cause.

I claim as my invention and desire to secure by United States Letters Patent—

1. In the art of extracting resinous, oily, essential, fatty or other matters from materials containing them, by means of volatile solvents, the improvement which consists in conducting the extracting operation in a confined atmosphere of gas or mixture of gases, replacing, removing or circulating the solvents in or by means of said confined atmosphere, then conducting such gas or mixture of gases free from the bulk of the solvent to a holder in order that it may be adapted for re-use substantially as described.

2. In the art of extracting resinous, oily, essential, fatty or other matters from materials containing them by means of volatile solvents, the improvement which consists in conducting the extracting operation in a confined atmosphere of an inert gas or mixture of such gases, removing or circulating the solvents by means of said confined atmosphere, then conducting such gas free from the bulk of the solvent to a holder in order that it may be adapted for re-use, substantially as described.

3. In the art of extracting resinous, oily, fatty, essential or other matters from materials containing them by means of volatile solvents, the improvement which consists in conducting the extracting operation in a confined atmosphere of nitrogen gas removing, replacing or circulating the solvent by means of said confined atmosphere, then conducting such gas or mixture of gases free from the bulk of the solvent to a holder in order that it may be adapted for re-use, substantially as described.

4. In apparatus for extracting resinous, oily, essential, fatty or other matters from materials, with volatile solvents, the combination of a digester, reservoirs or tanks containing the solvents employed, a gas-holder, a vacuum pump and valved piping or connections, whereby the gas in the holder is carried to the said digesters and reservoirs and returned to the holder, substantially as described and for the purpose set forth.

5. In apparatus for extracting resinous, oily, essential, fatty or other matters from materials, with volatile solvents, the combination of one or more digesters, reservoirs or tanks for the solvents employed, a holder for gas, a gas compressor, a reservoir for compressed gas, a vacuum pump, a condenser and suitably arranged valved piping communicating with said instrumentalities, whereby the gas is returned to the holder after it has circulated through the system, substantially as described and for the purpose set forth.

6. In apparatus for extracting resinous, oily, essential, fatty or other matters from materials, with volatile solvents, the combination of one or more digesters, reservoirs or tanks for the solvents employed, means for generating gas, a holder for the gas, a gas compressor, a reservoir for the compressed gas, a vacuum pump, a condenser and suitable arranged valved piping, whereby the gas in the holder is carried to the digester, reservoirs, compressor, &c., and then back to the holder, substantially as described and for the purpose set forth.

In testimony whereof I have affixed my signature in presence of two witnesses.

EMILE MAERTENS.

Witnesses:
GEO. H. REMINGTON,
LAWRENCE T. SMITH.